United States Patent
Ku et al.

(10) Patent No.: US 11,341,310 B1
(45) Date of Patent: May 24, 2022

(54) LAYOUT-VERSUS-SCHEMATIC (LVS) DEBUGGING AND ERROR DIAGNOSIS VIA TYPE OF GRAPH MATCHING

(71) Applicant: Synopsys, Inc., Mountain View, CA (US)

(72) Inventors: Chiu-Yu Ku, Taipei (TW); Wei-Shun Chuang, Taipei (TW); Chia-Wei Hsu, Taipei (TW)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/098,255

(22) Filed: Nov. 13, 2020

Related U.S. Application Data

(60) Provisional application No. 62/935,222, filed on Nov. 14, 2019.

(51) Int. Cl.
| | |
|---|---|
| *G06F 30/00* | (2020.01) |
| *G06F 30/398* | (2020.01) |
| *G06F 30/327* | (2020.01) |
| *G06F 30/392* | (2020.01) |

(52) U.S. Cl.
CPC .......... *G06F 30/398* (2020.01); *G06F 30/327* (2020.01); *G06F 30/392* (2020.01)

(58) Field of Classification Search
CPC ..... G06F 30/398; G06F 30/327; G06F 30/392
See application file for complete search history.

(56) References Cited

U.S. PATENT DOCUMENTS

| | | | |
|---|---|---|---|
| 6,009,252 A * | 12/1999 | Lipton | G06F 30/33 716/112 |
| 6,505,323 B1 | 1/2003 | Lipton et al. | |
| 6,799,307 B1 | 9/2004 | Lipton et al. | |
| 7,810,064 B2 | 10/2010 | Ladin et al. | |
| 8,181,137 B2 * | 5/2012 | Uppaluri | G11C 29/1201 716/112 |
| 8,397,194 B2 | 3/2013 | Uppaluri et al. | |
| 8,751,985 B1 | 6/2014 | Puri et al. | |
| 8,966,418 B2 | 2/2015 | Mojumder et al. | |
| 9,411,925 B2 * | 8/2016 | Meng | H05K 3/0005 |
| 9,779,193 B1 * | 10/2017 | Ginetti | G06F 30/398 |
| 10,255,401 B2 * | 4/2019 | Meng | G06F 30/39 |
| 10,339,246 B2 * | 7/2019 | Ganzhorn | G06F 30/3323 |
| 10,691,867 B2 * | 6/2020 | Chuang | G06F 30/327 |
| 10,915,573 B2 * | 2/2021 | Armenta Lopez | G06F 17/11 |
| 2017/0316118 A1 | 11/2017 | Wakefield et al. | |

* cited by examiner

*Primary Examiner* — Naum Levin
(74) *Attorney, Agent, or Firm* — Sterne, Kessler, Goldstein & Fox P.L.L.C.

(57) ABSTRACT

A method is disclosed including analyzing a layout netlist including a first set of nodes against a schematic netlist including a second set of nodes. Each node of the first and second sets of nodes is assigned a matching type for identifying matching nodes between the first and second sets of nodes. The method includes determining one or more unmatched nodes between the first set of nodes and the second set of nodes based on the matching type. The method includes generating a convergence graph comprising nodes of the first set of nodes that have a corresponding matching node in the second set of nodes based on the matching type, and the one or more unmatched nodes.

20 Claims, 9 Drawing Sheets

---
502   Process for constructing a convergence graph
---
JOIN_CONVERGENT_GRAPH(*CONV_G*, *u*, *iter*) {
   1.  *if* *u*.matched_iter > iter *or* size(*CONV_G*) < MAX_GRAPH_SIZE *or*
   2.    (*u*.node_type *is* DEVICE *and*
   3.    *u*.*machted_tpye* *is* (TPLG *or* ALYT)):
   4.      return;
   5.  *for_each* $v \in$ NEIGHBOR(*u*):
   6.    *CONV_G* = *CONV_G* $\cup$ {*v*}
   7.    JOIN_CONVERGENT_GRAPH(*CONV_G*, *v*)

504 }

GENERATE_CONVERGENT_GRAPH(*err*) {
   1.      *CONV_G* = {}
   2.      JOIN_CONVERGENT_GRAPH(*CONV_G*, *err*, *err*.matched_iter)
   3.      return *CONV_G*
}

FIG. 5

$$= \left[\frac{1}{\sum \frac{1}{sqrt(i)}} \sum_{i=1}^{n} \frac{1}{sqrt(i)} \left[ r(b) + \alpha \cdot r(g) \right] \beta^{r(b)} \right] \gamma^{r(o)}$$

602 prop 3
prop 2
prop 4
prop 1

FIG. 6

LAYOUT-VERSUS-SCHEMATIC (LVS) DEBUGGING AND ERROR DIAGNOSIS VIA TYPE OF GRAPH MATCHING

FIELD(S) OF TECHNOLOGY

The present disclosure is related to the field of integrated circuit (IC) design. More specifically, the present disclosure is related to layout-versus-schematic (LVS) debugging and error diagnosis via type of graph matching.

BACKGROUND

A typical electronic design automation (EDA) tool for providing layout-versus-schematic (LVS) debugging and error diagnosis receives a schematic netlist as a reference, and then match nodes against a layout design. In the layout design, there may be an unmatched node either as an extra node or a missing node.

One objective of LVS is to identify the differences and errors between two netlists from schematic and layout design. The LVS tool reports a list of unmatched nodes for users debugging. The available LVS tools, when enhanced to provide additional diagnoses (e.g., open/short and swapped connections, fix guidance, and generation of inaccurate or immature reports) are inevitable when there are sufficient errors, for example, power/ground shorts, soft-connect errors. Accordingly, matched results can be inaccurate, and a diagnosis based on these inaccurate matched/unmatched nodes can be misleading. In such situations, a large amount of human effort is involved, and the debugging becomes a very time-consuming process.

SUMMARY

The claims signify a brief description of one or more of the innovations, embodiments, and/or examples found within this disclosure.

In one embodiment, a method is disclosed. The method may include analyzing a layout netlist including a first set of nodes against a schematic netlist including a second set of nodes. Each node of the first and second sets of nodes may be assigned a matching type for identifying matching nodes between the first and second sets of nodes. The method may include determining one or more unmatched nodes between the first set of nodes and the second set of nodes based on the matching type. The method may include generating a convergence graph having nodes of the first set of nodes that have a corresponding matching node in the second set of nodes based on the matching type, and the one or more unmatched nodes.

In another embodiment, a system including a memory for storing operations, and one or more processors that are communicatively coupled to the memory is disclosed. The one or more processors may be configured to perform the operations including analyzing a layout netlist including a first set of nodes against a schematic netlist including a second set of nodes. Each node of the first and second sets of nodes may be assigned a matching type for identifying matching nodes between the first and second sets of nodes. The operations may include determining one or more unmatched nodes between the first set of nodes and the second set of nodes based on the matching type. The operations may include generating a convergence graph having nodes of the first set of nodes that have a corresponding matching node in the second set of nodes based on the matching type, and the one or more unmatched nodes.

In yet another embodiment, a method is disclosed. The method may include analyzing a layout netlist comprising a first set of nodes against a schematic netlist comprising a second set of nodes, wherein each node of the first set of nodes and each node of the second set of nodes is assigned a matching type for identifying matching nodes between the first set of nodes and the second set of nodes. The method may include specifying one or more matched nodes in a first set of nodes and the corresponding matched nodes in the second set of nodes. The method may include generating a convergence graph comprising nodes of the first set of nodes that have a corresponding matching node in the second set of nodes based on the matching type, and the one or more specified matched nodes of the first set of nodes and the corresponding matching node in the second set of nodes.

This Summary does not attempt to signify any particular innovation, embodiment, or example entirely as it can be used in commerce. Additionally, this Summary is not intended to signify essential elements of an innovation, embodiment, or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 illustrates a pseudo-code for constructing a convergence graph, in accordance with some embodiments.

FIG. 6 illustrates an example formula for calculating an error priority, in accordance with some embodiments.

Figure 1:
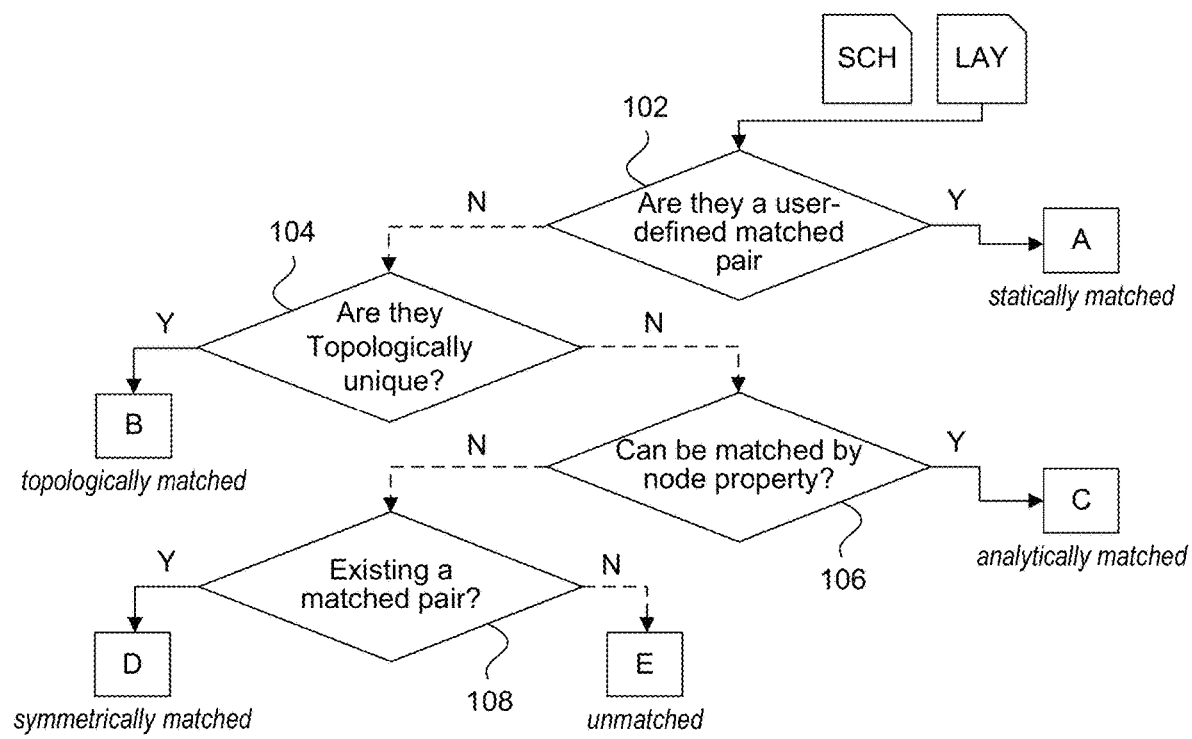
FIG. 1 illustrates a flow-chart of finding an unmatched node in accordance with some embodiments.

In such various figures, reference signs may be omitted as is consistent with accepted engineering practice. However, one of ordinary skill in the art will understand that the illustrated components are readily understood when viewed in the context of the illustration as a whole and the accompanying disclosure describing such various figures.

DETAILED DESCRIPTION

The Figures and the following Detailed Description signify innovations, embodiments, and/or examples by way of illustration only, with various features, structures, or characteristics described together in a single embodiment to streamline the disclosure. Variations of any of the elements, processes, machines, systems, manufactures, or compositions disclosed by such exemplary innovations, embodiments, and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments, and/or examples. In the interest of not obscuring the presentation of the exemplary innovations, embodiments, and/or examples in the following Detailed Description, some processing steps or operations that are known in the art may be combined for presentation and illustration purposes and might not be described in detail. However, a person skilled in the art will recognize that these exemplary innovations, embodiments, and/or examples may be used in commerce without these specific details or with equivalents thereof. In other instances, well-known processes and devices are not described in detail as not to unnecessarily obscure aspects of these exemplary innovations, embodiments, and/or examples. In other instances, some processing steps or operations that are known in the art may not be described at all. Instead, the following description is focused on the distinctive features or elements of various exemplary innovations, embodiments, and/or examples. Furthermore, while this description may refer to some components of the structure in the singular tense, more than one component may be depicted throughout the figures, and like components are labeled with like numerals.

Embodiments described herein may provide LVS error debugging/visualization/and error prioritization with the presence of the confidence level of matched instances and nets to assist users and automated tools in conducting error debugging in the most effective manner. Embodiments described herein may provide techniques and systems to debug LVS errors with the presence of the confidence level of matched instances and nets to assist users/tools to narrow down the suspect area of errors. A variety of applications on the confidence level are illustrated in this disclosure. For example, a user can visualize the confidence level on a graphical user interface (GUI) by using at least one visual attribute, for example, color, brightness, and/or thickness, etc., that enables the user to quickly envision the symmetrical part in the circuit structures, anchor the match pairs around the errors, and speculate the error suspects in the most effective manner. The visual attribute may be dependent on the confidence level. The confidence level of matched instances/nets may assist short-net debugging based on the strongest confidence level of instances where the pin connections reveal what the pin net should really connect to when the weakest confidence level of matched instances should not be considered so as not to confuse and obfuscate up this short analysis. Diagnosis results can utilize the confidence level to improve its accuracy and offer the error prioritization based on the surrounding matched instances.

Embodiments described herein may disclose feature techniques and systems to use the confidence level of matched instances and nets to debug common LVS problems. The confidence level of matched instances and nets may be quantified by a weighted scale of factors, for example, Statically matched, given by user instructions;
Topology matched, like device types, pin types, numbers of connections;
Analytical matched, Instance, and net attributes, for example, a name and a value;
Or any other factors used for LVS node matching.

In one embodiment, the statically matched type is weighted more than the other factors. The present system may receive a user-configured weightage of each factor. The confidence level of matched instances and nets may be used to determine a confidence level of an error score or error priority.

Depending on the types of LVS errors that the tool has identified, some embodiments may provide a guidance to inform users to speculate the problem by either starting from the ones with the strongest confidence level or the ones with the weakest.

LVS can be viewed as a graph-matching problem. Two different netlists are matched if they are functionally equivalent. Some devices may be merged or filtered, and some nets may be shorted without changing electrical, logical, or functional meanings.

Some embodiments described herein may produce a form of reduced graphs, namely a convergence graph for every LVS unmatched error. By way of a non-limiting example, a convergence graph may narrow down suspect area of errors based on the matching types.

Some embodiments may use five different matching types: (1) statically matched (2) topologically matched, (3) analytically matched, (4) symmetrically matched, and (5) unmatched. These five match types may also be represented by a color spectrum that improves the visibility of the matching procedure of LVS in a GUI. The colored and size-limited graphs of unmatched errors may provide a more intuitive debugging environment to the user. A convergence graph may represent each unmatched error for which the confidence level may be determined by calculating the ratio of these five matching types, node property, matching orders, etc. With a prioritized error list, the user may be provided guidance to fix layout errors in the most effective manner.

In accordance with some embodiments, a representation of LVS errors may be described as below. As mentioned above, some embodiments may provide a convergence graph for every unmatched error during LVS compare. Accordingly, the convergence graph is not only a graphical representation but also a process of how a node was determined to be an unmatched node. The convergence graph may isolate errors from the others by the nodes matched with high confidence. If nodes are uniquely matched, they may form the conceptual boundary of debugging LVS errors. The modification to LVS errors may be stopped at such strongly matched nodes. By way of a non-limiting example, this process may be extended to construct a convergence graph that may bound the suspect area. Accordingly, providing the convergence graph instead of n-hops surrounding errors may be more informative because the convergence graph may preserve only the nodes related to the unmatched errors.

In accordance with some embodiments, a process for determining a confidence level of LVS matching may be described as below. The uniqueness of nodes may be a hint for user debugging. Specifically, the more unique a node is, the more confident the matching is. In some embodiments, other than statistically matched by users, matching in topology may be considered to be the most confident matching. Nodes may be topologically matched based on the uniqueness of the position, connection, and attributes of the nodes.

By way of a non-limiting example, topological uniqueness may be propagated to neighbor nodes, therefore causing matching dependency.

In some embodiments, some nodes may be equivalent in topology but may also have distinguishable property such as instance name, pin/port name, whether the node belongs to a power or a ground net, dependent swappable, etc. These nodes may be matched analytically because they usually depend on the topologically matched nodes; they may have less confidence. In the symmetrically matched nodes, the symmetry of the nodes, such as swappable pins, memory cells, and/or symmetric device/cells, etc., may be compared. Thus the confidence level of symmetrical matched may be even lower.

In some embodiments, by way of a non-limiting example, the matching ordering can be part of the confidence level. The matching types and matching orders are discussed in more detail below.

In accordance with some embodiments, a graphical representation of LVS errors may be described as below. Traditional LVS errors may be shown by geometrical netlist connections. The graph may be extended to a large, complicated graph without giving the boundary of unmatched errors. Various embodiments described herein may categorize nodes into five matching types and color them by five different colors on the color spectrum. Users may identify which nodes are topologically matched so they have high confidence about and may skip inspecting the nodes connected through these nodes.

By way of a non-limiting example, the following five color series may be used in some embodiments: white for statically, blue for topologically, green for analytically, orange for symmetrically, and red for unmatched. Based on matching orders, the luminosity of color may be from low (high confidence) to high (less confidence), thereby visually highlighting the nodes having lower confidence level to attract the user's attention to those nodes.

An error priority based on the LVS matching technique and system may be described as below. LVS tools may classify errors into several types and report them in the ordering of the severity of error types. This kind of report has two disadvantages in the current design flow. First, errors in the same types have the same priority. When lots of errors occur, even a single category may contain thousands of errors. The user may not know which one is easier to fix. Second, the determined severity may be error-prone when multiple factors cause a group of nodes to be unmatched because the severity is based on the human experience.

Various embodiments described herein may provide feature techniques and systems that focus on the error priority based on matching confidence. By way of a non-limiting example, a net shorted with topologically matched devices may be more important to fix than the one with symmetrically matched devices. Various embodiments described herein may provide feature techniques and systems that do not apply in-depth analysis to error diagnosis unless they are at high priority, and thereby saving computing resources and intensive labor work.

In some embodiments, a convergence graph may be constructed and used as defined below. Given a convergence graph G of a netlist, where G=(V, E), V={D∪N}. D includes device nodes (i.e., layout nodes); N includes net nodes (i.e., schematic nodes); E shows the connectivity between D and N.

By way of a non-limiting example, each node may have attributes, including, but not limited to:

name: a unique string of a node node type: {NET|DEVICE} pin count number (N only): $\in Z^+$, the total number of connected pins.

cell type (D only): a string of the cell name device type (D only): a string of the device type, e.g. n-type MOSFET (NMOS), p-type MOSFET (PMOS), capacitor (CAP), resistor (RES).

matching iteration: $\in Z^+$, the ordering of matching the node matching type: {unmatched (UNMC), statistically matched (STAT), topologically matched (TPLG), analytically matched (ALYT), symmetrically matched (SYMM)}, label history: list of integer pin class and pin names (D only): list of integer, list of string permutation number (D only): $\in Z^+$ permutation group (D only): a set of permutation pair.

In the above list of attributes, the attributes with a leading dash ("-") may be acquired in netlists. The attributes with a leading asterisk ("*") may be obtained during the LVS compare process.

Additionally, details of the attributes with a leading asterisk are shown below:

matching iteration: LVS tools determine nodes matching in sequential order. The matching iteration may be a unique number or a round number shared by a set of nodes.

Matching type: Node matching can be categorized into five types.

FIG. 1 illustrates a process for determining the matching type in accordance with some embodiments described herein. At 102, the process checks if the nodes from a schematic (SCH) and a layout (LAY) are matched based on a user-defined matched pair. If so, the matching type is statically matched, and the process ends (at A). The user may specify rules for when the two nodes are matched. The nodes in the statically matched matching type may be either device nodes or net nodes.

At 104, a check is performed to determine if the nodes are matched based on topology. If the nodes are matched based on topology, the matching type is topologically matched and the process ends (at B). In the topology matched matching type, a pair of nodes in netlists may be uniquely matched in the given topology. Topology uniqueness may include the position of nodes, connectivity of nodes, device/cell type of device/cell nodes, connected pin types of net nodes, and/or connected pins with dependent swappable of net nodes.

If the nodes are not matched based on topology, the process proceeds to 106, which checks if the nodes are matched based on node property. If the nodes are matched based on node property, the matching type is determined to be analytically matched, and the process ends (at C). In the analytically matched matching type, a matching pair may not be determined until additional information including device name, net name, pin names, power and/or ground net, port name, and/or node electric property, etc. applied.

If the nodes are not matched based on node property, the process proceeds to 108, which checks if the nodes are symmetrically matched based on an existing match pair. If the nodes are symmetrically matched based on an existing matched pair, the matching type is determined to be symmetrically matched, and the process ends (at D). In the symmetrically matched matching type, multiple candidates are possible for matching a node on the other side, i.e., the schematic. The LVS tool may find one pair for matching that may be nodes connected with swappable pins and nodes in symmetric circuit design.

If the nodes are not symmetrically matched based on an existing match pair, the matching type is determined to be unmatched, i.e., the process was unable to match the node and the process ends at E.

Additionally, details of the further attributes with a leading asterisk are as shown below:

Labeling history: LVS tools can have a coloring scheme. They label nodes with topological information and try to find a unique partition in every matching iteration. The history of labeling shows the structural uniqueness and the alternatives of matching.

Pin class and pin names (D only): Some pins in the IC design are swappable. Some embodiments described herein tag pins with the same integer number if they are swappable. For instances of a cell, they have the identical pin class number along with pin names.

Permutation number (D only): when a part of the netlist graph forms a symmetrical structure, a node can be matched with multiple candidates. We record the total number of alternative matching in this attribute.

Permutation group (D only): a set of alternatively matching pairs.

In accordance with some embodiments, the convergence graph may be regarded as a tree data structure with multiple root nodes and generated, starting with an error node as its root and its neighbors as its children. The convergence graph generation process may recursively join the nodes until traversing the nodes statically, topologically, analytically matched, or reaching the limit of graph size. The level of a node may be defined as the minimal distance to an unmatched node.

By way of a non-limiting example, there may not be any unmatched node between the schematic netlist and the layout netlist. A node may be unmatched if it is an additional and/or missing node between the schematic netlist and the layout netlist. The unmatched node may be a node in the layout netlist or schematic netlist having different matching attribute from a node in the schematic netlist or layout netlist.

Figure 2:
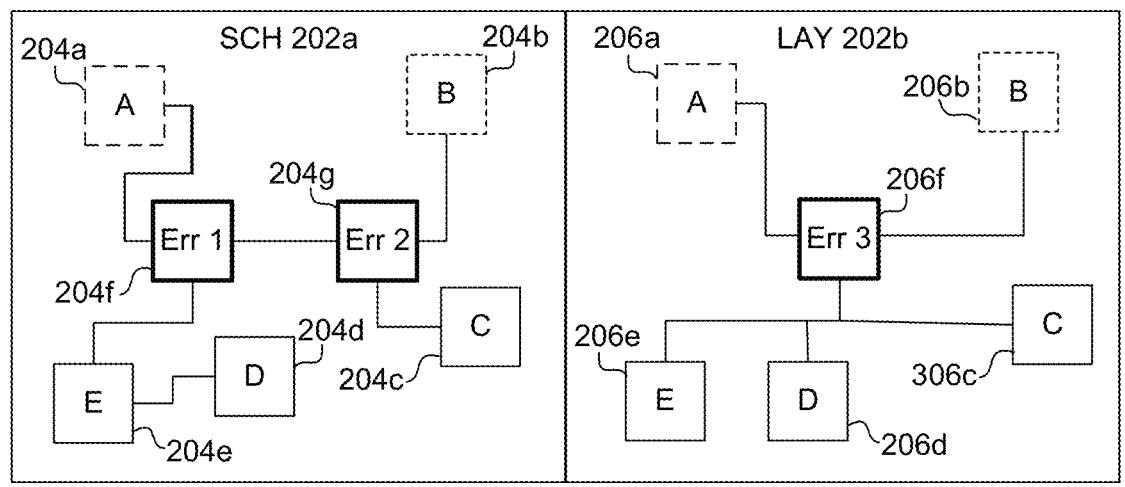
FIG. 2 illustrates an example of a convergent unmatched error, in accordance with some embodiments.

FIG. 2 illustrates a convergent unmatched error in accordance with some embodiments described herein. As shown in FIG. 2, a schematic 202a has nodes A, B, C, D, E, Err 1, and Err 2 as 204a-204g respectively, and a layout 202b has nodes A, B, C, D, E, and Err 3 as 206a-206f respectively. Since the schematic 202a and the layout 202b differ in the area where the nodes Err 1, Err 2, and Err 3 are located and the nets connected to them, the nodes Err 1, Err 2, and Err 3 and nets connected to them may be shown in a first color (e.g., red color) to draw the user's attention to the errors. Further, as shown in FIG. 2, nodes 204b and 206b may be statistically matched and may be shown in a second color (e.g., white color), nodes 204a and 206a may be topologically matched and may be shown in a third color (blue color), nodes 204c-e and 206c-e may be analytically matched and may be shown in a fourth color (e.g., green color), and thus leaving nodes 204f-g and 206f as unmatched nodes that may be shown in the first color (e.g., red color).

Figure 3:
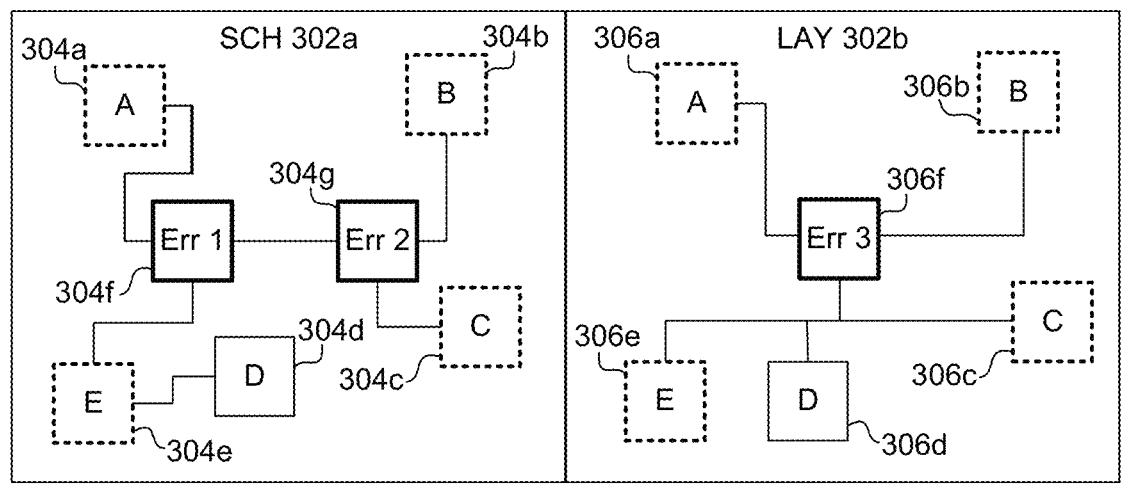
FIG. 3 illustrates an example of a divergent unmatched error, in accordance with some embodiments.

FIG. 3 illustrates a divergent unmatched error in accordance with some embodiments described herein. As shown in FIG. 3, a schematic 302a has nodes A, B, C, D, E, Err 1, and Err 2 as 304a-304g respectively, and a layout 302b has nodes A, B, C, D, E, and Err 3 as 306a-306f respectively. Since the schematic 302a and the layout 302b differ in the area where the nodes Err 1 304f, Err 2 304g, and Err 3 306f are located and the nets connected to them, the nodes Err 1 304f, Err 2 304g, and Err 3 306f and nets connected to them may be shown in a first color (e.g., red color) to draw the user's attention to the errors. Further, as shown in FIG. 3, nodes 304a, 304b, 304c, and 304e, and corresponding nodes 306a, 306b, 306c, and 306e may be symmetrically matched and shown in orange color, and node 304d and node 306d may be analytically matched and may be shown in a second (e.g., green color).

Figure 4:
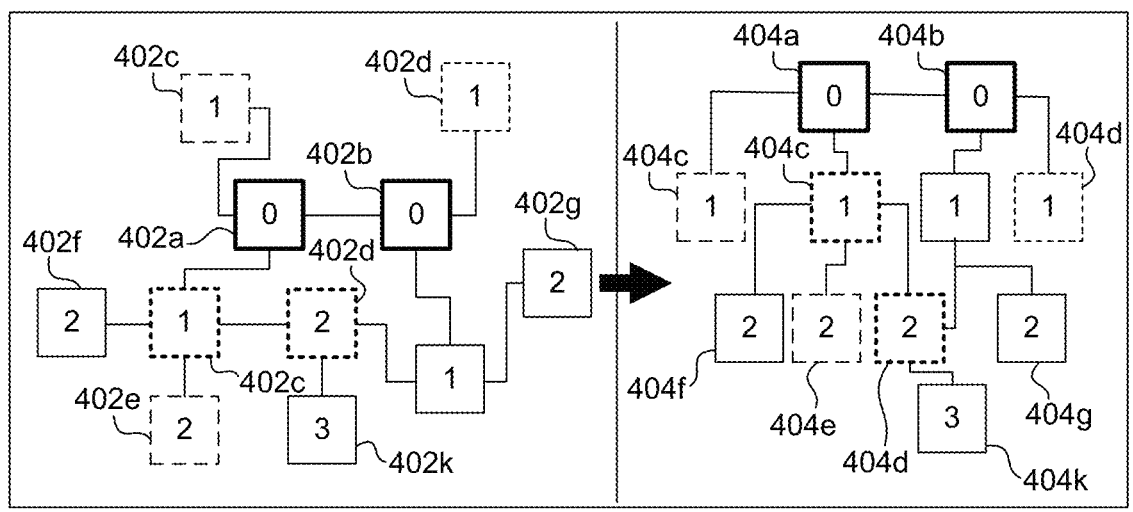
FIG. 4 illustrates an example of a convergence graph with node levels, in accordance with some embodiments.

FIG. 4 illustrates a convergence graph and the node levels in accordance with some embodiments described herein. As described above, the convergence graph may be constructed beginning with the error nodes 402a and 402b as the root nodes 404a and 404b of the convergence graph and the remaining nodes 402c-k as the children nodes 404c-k of the root nodes 404a and 404b. By way of a non-limiting example, a matched node may also be selected a root node of the convergence graph. The matched node to be used as the root node may be specified by the user.

FIG. 5 illustrates an example pseudo-code of functions that may be used for constructing a convergence graph in accordance with some embodiments described herein. The "GENERATE_CONVERGENT_GRAPH" function 502 may generate a convergence graph CONV_G starting from error node "err," and the "JOIN_CONVERGENT_GRAPH" function 504 may build the convergence graph by recursively adding nodes to the convergence graph.

In some embodiments, error priority may be calculated based on the properties of the nodes. The intuition of each of the properties, and the impact that each property has on the final error score is as follows.

1. Deeper nodes may contribute less impact.
2. At any level, topologically matched node (blue) may contribute more than analytically matched (green) nodes.
3. For topologically matched (blue) nodes, the score of itself may be equal or larger than the score of any level of extended subtrees from it.
4. A higher ratio of the symmetrically matched (orange) nodes may lower the score.

FIG. 6 illustrates a formula 602 that may be used to calculate an error score in accordance with some embodiments described herein. The terminology used in the formula is as follows:
  n: the maximum number of levels
  i: the level of nodes
  u: the # of unmatched at level i.
  t: the # of topologically matched at level i
  a: the # of analytically matched at level i
  s: the # of symmetrically matched at level i
  $\alpha$ (0, 1), suggested 0.5
  $\beta$: (1, $\alpha^{-1}$) suggested 1.1
  $\gamma$: (0,1), suggested 0.1
  r(x): ratio of node type Some disadvantages of typical LVS techniques using off-the-shelf LVS tools are that they do not provide (1) matching ordering and matched types of unmatched errors, (2) unmatched error priority (ranking), (3) a graph showing the boundary of unmatched errors, and (4) detailed diagnosis. In existing approaches, users can fix layout design error solely based on their experience. For example, they might try to correct the shorted net or opened net firstly. Next, to address extra or missing devices, they might try any possible configuration such as merge_series( ), merge_parallel( ), and filter( ) to make the total number of devices consistent. If compound errors occur, users may randomly fix an error, then expecting the error is reduced. For these reasons, current debugging is labor-intensive.

In contrast to typical approaches, embodiments described herein may preserve more information about how nodes are matching. Additionally, convergence graph may also narrow down the scope of debugging and may be used for error priority that can significantly reduce the time and effort of debugging. Embodiments described herein thus have at least the following three advantages over current methods. First, the various embodiments described herein may provide a better graphical presentation that is based on a different color used for a node based on the type of matching. For example, statistically matched nodes may be represented in white color, topologically matched nodes may be represented in blue color, analytically matched nodes may be represented in green color, symmetrically matched nodes may be represented in orange color, and unmatched nodes may be represented in red color. The colored convergence graph thus helps in debugging the problems as they are simplified. In addition, the user can see the better matching quality directly and thereby improves performance and quality. The better matching quality may occur as in-depth analysis to symmetry is feasible and suggestions to LVS runset configuration.

Other advantages that may be derived from the various embodiments described herein may include accurate diagnostics since the concise graph preserves significant information during LVS compare and discovery of the root cause of compound errors are realizable. It may also provide suggestions on how to fix the errors.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During the logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level, and parasitics can be extracted. During physical verification, the design can be checked to ensure correctness for manufacturing, electrical issues, lithographic issues, and circuitry.

During resolution enhancement, geometric manipulations can be performed on the layout to improve the manufacturability of the design. During mask data preparation, the design can be "taped out" to produce masks which are used during fabrication.

As mentioned above, the HDL code can be translated to a netlist during synthesis. A netlist describes a network of logical building blocks (e.g., AND gates, OR gates, MUXs, etc.) that implement the desired functionality of the IC design. After the synthesis stage, the IC design flow can perform placement, during which the network of logical building blocks is implemented by using a network of cells. A cell represents an actual portion of the physical IC chip that will be created when the IC design is manufactured. Placement involves assigning a physical location to each cell in the IC design. After placement, the IC design flow can perform routing, which involves determining routes for metal wires to electrically connect the placed cells.

A netlist is a list (or collection) of "nets." Each "net" refers to a set of gates (or cells) whose inputs/outputs are electrically connected. For example, suppose a driver cell drives the inputs of a set of driven cells. In this example, the term "net" can refer to the portion of the netlist that includes the driver cell, the set of driven cells, and the electrical connections (e.g., the network of metal wires) that connect the output of the driver cell and the inputs of the set of driven cells. Each of these steps—synthesis, placement, and routing—is complex and includes multiple sub-steps. During an actual IC design flow, multiple iterations may be required before the IC design converges and meets the desired performance and yield targets.

Figure 7:
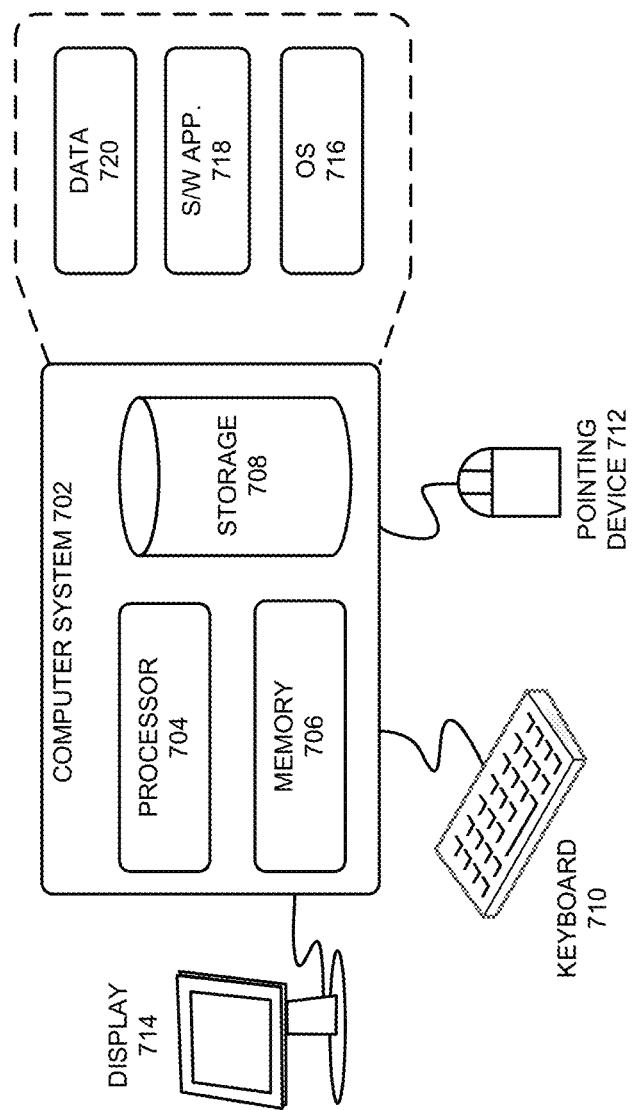
FIG. 7 illustrates an example computing system, in accordance with some embodiments.

FIG. 7 illustrates a computer system in accordance with some embodiments described herein. The term "computer" or "computer system" generally refers to a hardware-based system that can perform computations required for the design and manufacture of ICs. Computer system 702 can include processor 704, memory 706, and storage device 708. Computer system 702 may include multiple processors, and processor 704 may include multiple cores. Specifically, memory locations in memory 706 can be addressable by processor 704, thereby enabling processor 704 to access (e.g., via load/store instructions) and manipulate (e.g., via logical/floating point/arithmetic instructions) the data stored in memory 706. Computer system 702 can be coupled to display device 1014, keyboard 1010, and pointing device 1012. Storage device 708 can store operating system 1016, software application 1018, and data 1020. Data 1020 can include input required by software application 1018 and/or output generated by software application 1018.

Computer system 702 may automatically (or with user help) perform one or more operations that are implicitly or explicitly described in this disclosure. Specifically, computer system 702 can load software application 718 into memory 706, and software application 718 can then be used to design an IC. The resulting IC design is expected to have better performance and/or quality of results (QoR) because the IC design flow interleaves delay optimization of combinational and sequential instances.

Figure 8:
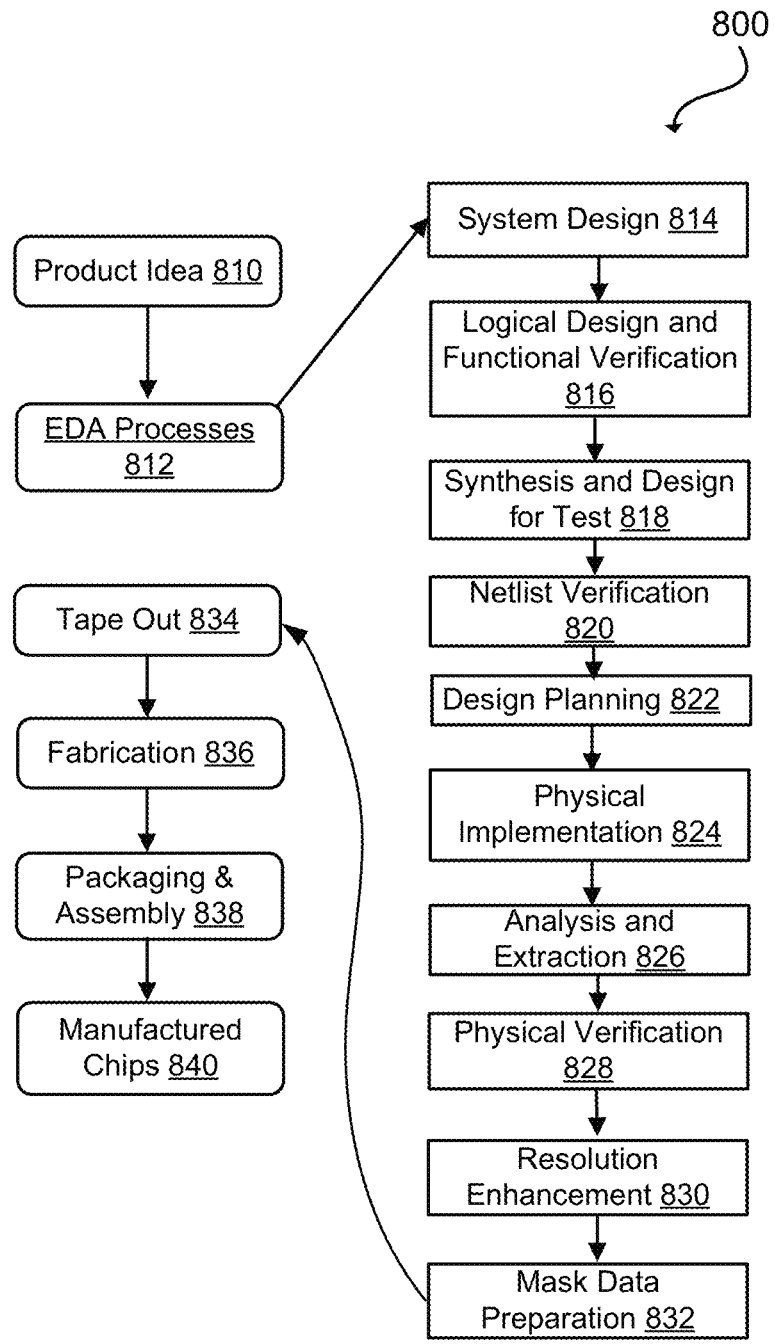
FIG. 8 illustrates a flow-chart of various processes used during the design and fabrication of an integrated circuit in accordance with some embodiments.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information that is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836, and packaging and assembly processes 838 are performed to produce the finished integrated circuit 840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 11. The processes described by being enabled by EDA products (or tools).

During system design 814, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 816, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 818, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for the production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for the development of cells for the library and for the physical and logical design that use the library.

Figure 9:
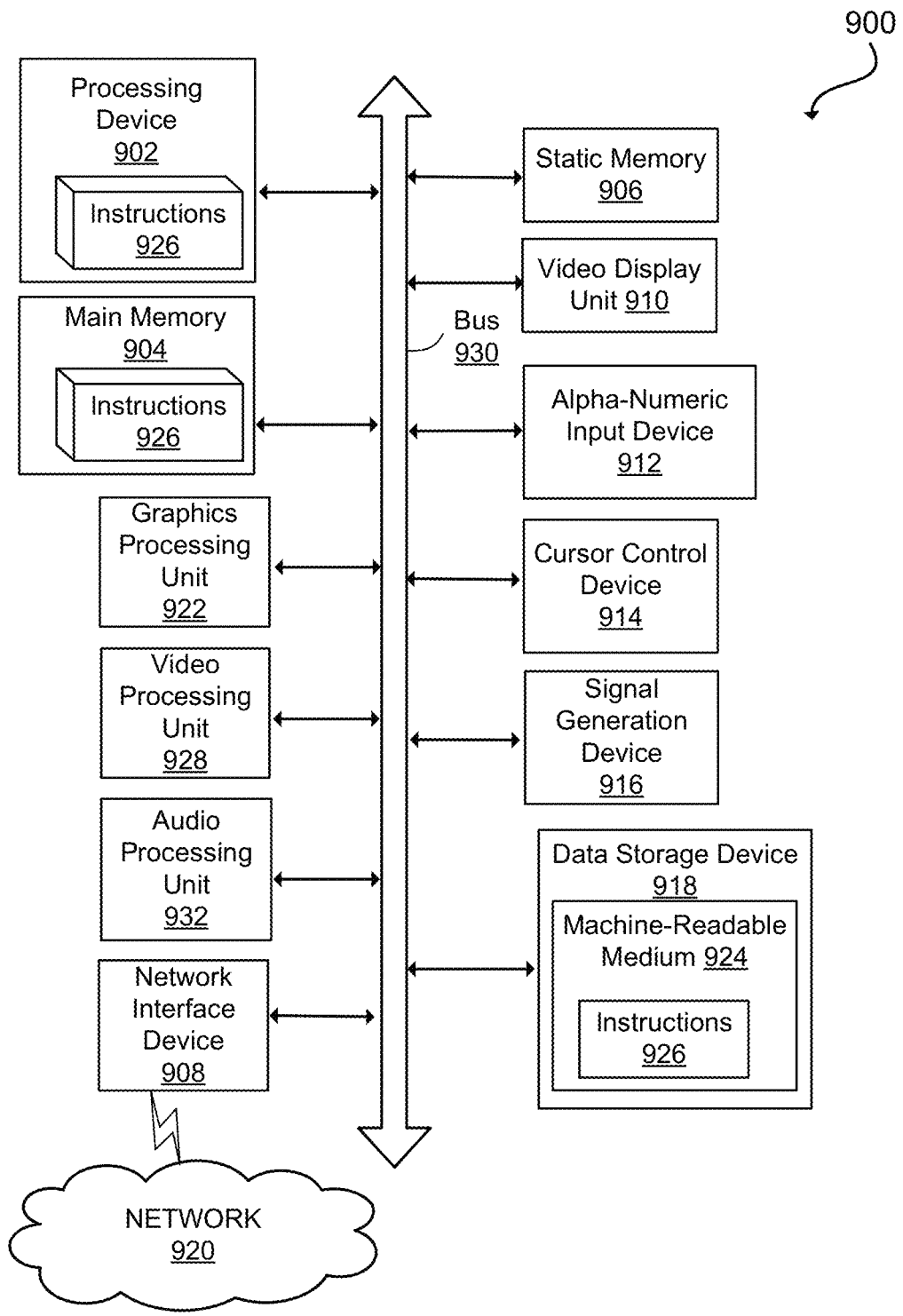
FIG. 9 illustrates an abstract diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

The processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 may also be one or more special-purpose processing devices such as an application-specific integrated circuit (ASIC), a field-programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904, and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A method, comprising:
    assigning a matching type to each node of a first set of nodes of a layout netlist and each node of a second set of nodes of a schematic netlist for identifying matching nodes between the first set of nodes and the second set of nodes;
    determining one or more unmatched nodes between the first set of nodes and the second set of nodes based on the matching type; and
    generating a convergence graph comprising the one or more unmatched nodes as root nodes and nodes of the first set of nodes that have a corresponding matching node in the second set of nodes based on the matching type as children nodes of the root nodes.

2. The method of claim 1, further comprising representing each node of the first set of nodes that has a corresponding node in the second set of nodes using a visual attribute assigned for the matching type.

3. The method of claim 2, wherein the visual attribute comprises at least one or more of color, thickness, and brightness.

4. The method of claim 1, further comprising representing the one or more unmatched nodes using a visual attribute comprising at least one or more of color, thickness, and brightness.

5. The method of claim 1, further comprising generating another convergence graph comprising each node of nodes in the second set of nodes that has a corresponding node in the first set of nodes and the one or more unmatched nodes in the second set of nodes without a corresponding node in the first set of nodes.

6. The method of claim 5, further comprising representing each node in the second set of nodes that has a corresponding node in the first set of nodes using a visual attribute assigned for the matching type attribute, wherein the visual attribute comprises color.

7. The method of claim 5, further comprising representing the one or more unmatched nodes in the second set of nodes without the corresponding node in the first set of nodes using a visual attribute comprising color.

8. The method of claim 1, further comprising determining a confidence level of at least one of matched node and unmatched node in the first set of nodes based on the convergence graph.

9. The method of claim 8, further comprising displaying the at least one of matched node and unmatched node in a graphical user interface (GUI) using a visual attribute that is based on the confidence level.

10. The method of claim 1, further comprising calculating an error priority of at least one unmatched node in the first set of nodes without a corresponding node in the second set of nodes based on the convergence graph.

11. A system, comprising:
    a memory for storing operations; and
    one or more processors, communicatively coupled to the memory, configured to perform the operations comprising:
        assigning a matching type to each node of a first set of nodes of a layout netlist and each node of a second set of nodes of a schematic netlist for identifying matching nodes between the first set of nodes and the second set of nodes;
        determining one or more unmatched nodes between the first set of nodes and the second set of nodes based on the matching type; and
        generating a convergence graph comprising the one or more unmatched nodes as root nodes and nodes of the first set of nodes that have a corresponding matching node in the second set of nodes based on the matching type as children nodes of the root nodes.

12. The system of claim 11, the operations further comprising:
    representing each node of the first set of nodes that has a corresponding node in the second set of nodes using a visual attribute assigned for the matching type.

13. The system of claim 11, the operations further comprising representing the one or more unmatched nodes using a visual attribute comprising at least one or more of color, thickness, and brightness.

14. The system of claim 11, the operations further comprising generating another convergence graph comprising each node of nodes in the second set of nodes that has a corresponding node in the first set of nodes and the one or more unmatched nodes in the second set of nodes without a corresponding node in the first set of nodes.

15. The system of claim 14, the operations further comprising representing each node in the second set of nodes that has a corresponding node in the first set of nodes using a visual attribute assigned for the matching type, wherein the visual attribute comprises color.

16. The system of claim 14, the operations further comprising representing the one or more unmatched nodes in the second set of nodes without the corresponding node in the first set of nodes using a visual attribute comprising color.

17. A method, comprising:
    analyzing a layout netlist comprising a first set of nodes against a schematic netlist comprising a second set of nodes, wherein each node of the first set of nodes and each node of the second set of nodes is assigned a matching type for identifying matching nodes between the first set of nodes and the second set of nodes;

specifying one or more matched nodes in the first set of nodes and the corresponding matched nodes in the second set of nodes; and generating a convergence graph comprising nodes of the first set of nodes that have a corresponding matching node in the second set of nodes based on the matching type, and the one or more specified matched nodes of the first set of nodes and the corresponding matching node in the second set of nodes.

18. The method of claim 17, further comprising representing each node of the first set of nodes that has a corresponding node in the second set of nodes using a visual attribute assigned for the matching type.

19. The method of claim 18, wherein the visual attribute comprises at least one or more of color, thickness, and brightness.

20. The method of claim 17, further comprising calculating an error priority of at least one unmatched node in the first set of nodes without a corresponding node in the second set of nodes based on the convergence graph.

\* \* \* \* \*